(12) United States Patent
Ren et al.

(10) Patent No.: US 11,552,299 B2
(45) Date of Patent: Jan. 10, 2023

(54) SEMI-TUBULAR CARBON FILM FOR STABLE LITHIUM METAL ANODES AND METHODS OF MANUFACTURE THEREOF

(71) Applicant: UNIVERSITY OF HOUSTON SYSTEM, Houston, TX (US)

(72) Inventors: Zhifeng Ren, Pearland, TX (US); Siya Huang, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 311 days.

(21) Appl. No.: 16/644,437

(22) PCT Filed: Aug. 24, 2018

(86) PCT No.: PCT/US2018/048013
§ 371 (c)(1),
(2) Date: Mar. 4, 2020

(87) PCT Pub. No.: WO2019/050703
PCT Pub. Date: Mar. 14, 2019

(65) Prior Publication Data
US 2020/0212448 A1    Jul. 2, 2020

Related U.S. Application Data

(60) Provisional application No. 62/556,839, filed on Sep. 11, 2017.

(51) Int. Cl.
*H01M 4/00* (2006.01)
*H01M 4/62* (2006.01)
(Continued)

(52) U.S. Cl.
CPC .......... *H01M 4/628* (2013.01); *C01B 32/158* (2017.08); *H01M 4/0411* (2013.01);
(Continued)

(58) Field of Classification Search
CPC . C01P 2004/10; C01P 2006/40; H01M 4/045; H01M 4/0411; H01M 10/0552; H01M 2220/30; H01M 4/628
See application file for complete search history.

(56) References Cited

U.S. PATENT DOCUMENTS

2010/0330423 A1  12/2010  Cui et al.
2016/0111730 A1   4/2016  Kim et al.

OTHER PUBLICATIONS

Huang, Siya et al., A Highly Flexible Semi-Tubular Carbon Film for Stable Lithium Metal Anodes in High-Performance Batteries,: Nano Energy, vol. 38, Jun. 16, 2017, pp. 504-509 (6p).*
(Continued)

*Primary Examiner* — Cynthia H Kelly
*Assistant Examiner* — Monique M Wills
(74) *Attorney, Agent, or Firm* — Conley Rose, P.C.

(57) ABSTRACT

A method of forming a battery electrode by forming, on a first substrate, a polymer template comprising interconnected polymer fibers, forming, on the polymer template, a carbon coating to form a carbon-coated polymer template, removing the carbon-coated polymer template from the first substrate, subsequent to removing the carbon-coated polymer template from the first substrate, removing the polymer template from the carbon coating, and disposing the carbon coating on a second substrate. A solid electrolyte interphase layer (SEI) comprising the carbon coating produced via the method, a battery electrode comprising such an SEI layer, and a battery comprising such a battery electrode are also provided.

20 Claims, 16 Drawing Sheets

(51) Int. Cl.
*C01B 32/158* (2017.01)
*H01M 4/04* (2006.01)
*H01M 4/134* (2010.01)
*H01M 4/1395* (2010.01)
*H01M 10/052* (2010.01)

(52) U.S. Cl.
CPC ......... *H01M 4/134* (2013.01); *H01M 4/1395* (2013.01); *H01M 10/052* (2013.01); *C01B 2202/22* (2013.01); *C01P 2004/13* (2013.01); *C01P 2006/40* (2013.01); *H01M 2220/30* (2013.01)

(56) References Cited

OTHER PUBLICATIONS

PCT/US2018/048013 International Search Report and Written Opinion dated Oct. 10, 2018 (19 p.).

\* cited by examiner

Bare Cu Electrode

Separator

Modified Electrode

Separator

SEMI-TUBULAR CARBON FILM FOR STABLE LITHIUM METAL ANODES AND METHODS OF MANUFACTURE THEREOF

CROSS-REFERENCE TO RELATED APPLICATIONS

This application is a 35 U.S.C. § 371 national stage application of PCT/US2018/048013 filed Aug. 24, 2018, entitled "Semi-Tubular Carbon Film for Stable Lithium Metal Anodes and Methods of Manufacture Thereof," which claims priority to U.S. Provisional Patent Application No. 62/556,839, filed Sep. 11, 2017 and entitled "Semi-Tubular Carbon Film for Stable Lithium Metal Anodes and Methods of Manufacture Thereof", the disclosure of which is hereby incorporated herein by reference as if reproduced in their entirety for all purposes.

STATEMENT REGARDING FEDERALLY SPONSORED RESEARCH OR DEVELOPMENT

This research is sponsored in part by the US Department of Energy under grant DOE DE-SC0010831.

BACKGROUND

Lithium metal batteries employ lithium for the anode and may have higher charge density and therefore a longer lifespan than other types of batteries. Lithium metal batteries are employed in a wide variety of devices, including various portable electronic devices such as computing devices and peripheral devices, as well as medical devices including medical implants and in subsea applications.

Secondary Li-metal batteries have serious safety concerns. For example, mossy Li dendrites form during discharge/charge cycling. Such Li dendrites can pierce through the separator and cause short circuits. Another side effect of this uneven Li deposition/dissolution process may be the concurrent low Coulombic efficiency (CE), resulting in high internal cell resistance with a short service life. The challenges facing Li metal batteries lie in the fact that the spontaneously formed solid electrolyte interphase (SEI) layer cannot accommodate the large volume change of Li metal anodes upon cycling. During repeated Li plating/stripping, the rigid SEI layer on Li metals keeps breaking and repairing, combined with continuous electrolyte consumption and Li corrosion. As a result, the batteries end up drying up or even run into short circuits.

Maintaining the integrity of the SEI layer may improve Coulombic efficiencies by protecting Li anodes from electrolyte corrosion and consequently inhibiting the formation of Li dendrites. Accordingly, a need exists improved systems and methods for maintaining the integrity of an SEI layer.

SUMMARY OF THE DISCLOSURE

Herein disclosed is a method of forming a battery electrode, the method comprising: forming, on a first substrate, a polymer template comprising interconnected polymer fibers; forming, on the polymer template, a carbon coating to form a carbon-coated polymer template; removing the carbon-coated polymer template from the first substrate; subsequent to removing the carbon-coated polymer template from the first substrate, removing the polymer template from the carbon coating; and disposing the carbon coating on a second substrate.

Also disclosed herein is a solid electrolyte interphase (SEI) layer for use in a battery electrode, the SEI layer comprising: a semi-tubular carbon film comprising two or more adjacent smoothly-curved, intersecting structures that extend less than 360°.

Further disclosed herein is an electrode comprising an SEI layer comprising: a semi-tubular carbon film comprising two or more adjacent smoothly-curved, intersecting structures that extend less than 360°.

DETAILED DESCRIPTION OF THE DISCLOSED EXEMPLARY EMBODIMENTS

Figure 1:
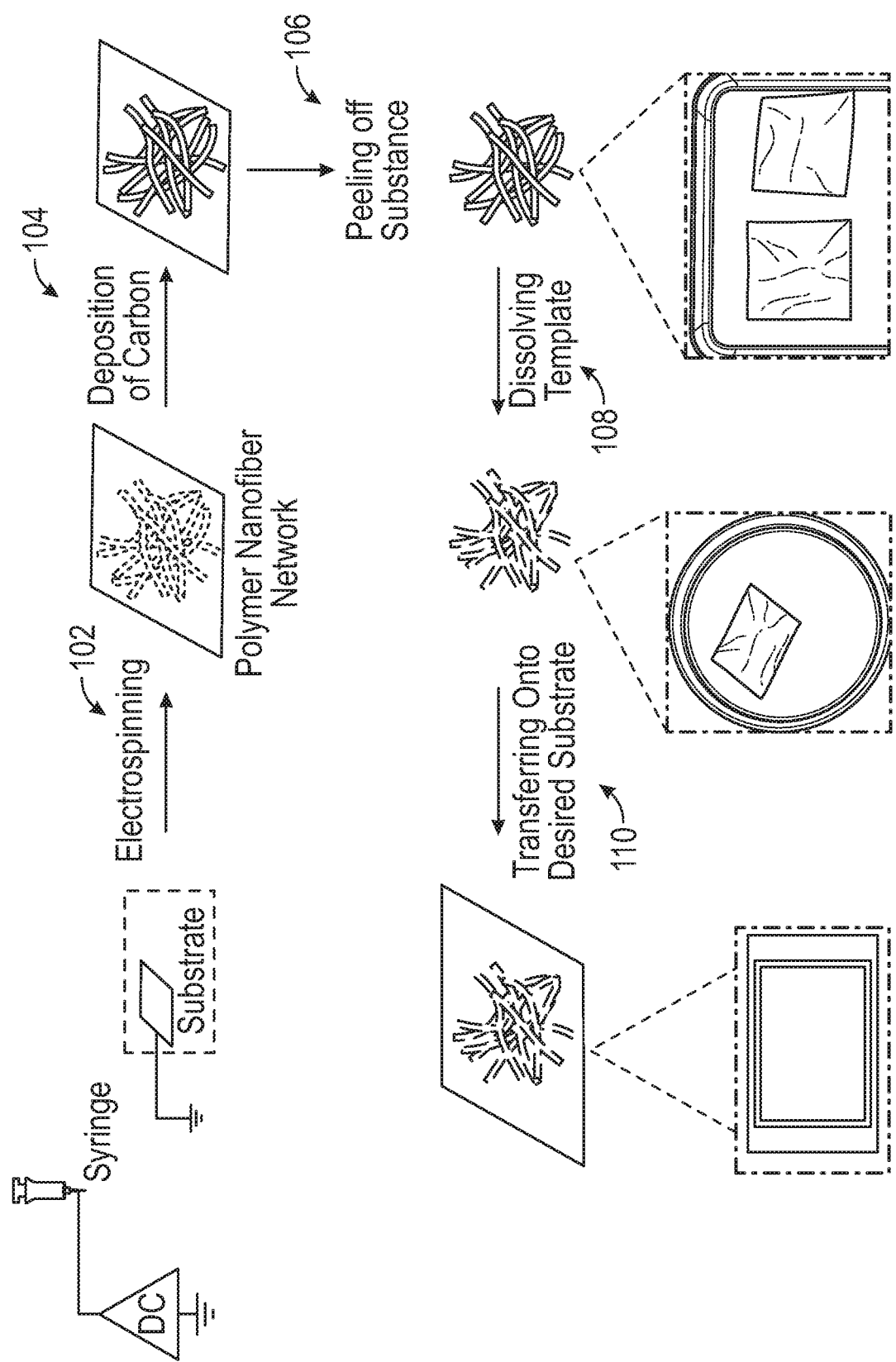
FIG. 1 is a schematic illustration of a fabrication and transfer process of semi-tubular carbon films according to certain embodiments of the present disclosure.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ."

The reference, "A highly flexible semi-tubular carbon film for stable lithium metal anodes in high-performance batteries," Nano Energy 38 (2017), 504-509, is hereby incorporated herein by reference in its entirety for purposes not contrary to this disclosure.

Lithium (Li)-metal-based battery technology with enhanced capacities is a focus of technology development due to the increasing demand in portable electronics, electric cars, and grid storage. Li metal can pair with Li-free cathodes such as sulfur (S) and oxygen ($O_2$), offering a high specific energy of 2567 Wh $kg^{-1}$ (Li—S) and 3505 Wh $kg^{-1}$ (Li—$O_2$), respectively. In comparison with commercial graphite-based Li-ion batteries which may typically have a lower specific energy of about 200 Wh $kg^{-1}$, Li metal batteries show one order of magnitude increase in specific energy, which boosts the electrification of transport as well as large-scale stationary energy storage. However, as noted above, secondary Li-metal batteries have serious safety concerns, for example, mossy Li dendrites form during discharge/charge cycling, which can pierce through the separator and cause short circuits. This uneven Li deposition/dissolution process may also result in the side effect of concurrent low Coulombic efficiency (CE), resulting in high internal cell resistance with a short service life. Maintaining the integrity of the SEI layer may improve CEs by protecting Li anodes from electrolyte corrosion and consequently inhibiting the formation of Li dendrites. Herein disclosed is a straightforward and efficient system and method for protecting Li anodes by physical protection.

As discussed herein, a stable artificial SEI layer for Li metal anodes that includes carbon film should be ionically conductive, while electrically insulating. In addition, both mechanical flexibility and adhesion to the anode are desirable to maintain the coating integrity by accommodating the large volume change of Li plating/stripping without breaking. Discussed herein is a flexible, freestanding carbon film comprising or consisting of a semi-tubular structure that may be from about 5.0 nm to about 1 micron thick. In embodiments, the carbon film may be nanostructured. This semi-tubular carbon structure can be fabricated at room temperature (e.g., from about 20° C. —to about 25° C.) and can subsequently be transferred onto anodes as a conformal protection layer. That is, the herein disclosed semi-tubular carbon structure is robust, yet flexible enough to conform to the anode (and, thus, may be referred to herein as a 'conformal' layer). In contrast to a conventional, thick layer of native SEI caused by uncontrolled in-situ chemical passivation, the thickness of the semi-tubular carbon film of this disclosure can be precisely tailored within tens of nanometers, enabling fast transportation of Li ions and stable cycling up to over about 1500 hours. The semi-tubular carbon film disclosed herein provides an industrially compatible route to achieve Li metal protection, and can be manufactured and assembled in a standard dry-room environment of practical battery manufacturing. As utilized herein, a "semi-tubular" structure comprises a structure that, when viewed as a cross-section, comprises two or more adjacent smoothly-curved, intersecting structures that extend less than 360 degrees.

The as-prepared, freestanding carbon film of this disclosure is both mechanically robust and electrochemically stable, and, as-formed, is ready to be easily transferred onto electrodes with adequate adhesion. It was discovered that a stable SEI layer was formed on top of the semi-tubular carbon film, which can isolate the Li metals from the corrosive electrolyte and suppress the growth of Li dendrites upon cycling at practical current densities up to 0.25-1.0 mA $cm^{-2}$. In embodiments, the modified electrodes of this disclosure show high cycling stability, with significantly enhanced CEs up to about 99.5% (e.g., for hundreds of cycles and/or thousands of operation hours). In comparison to pristine electrodes with intrinsic SEI formation, the semi-tubular carbon film of this disclosure can serve as an artificial SEI film, exerting an instant and more efficient protection on Li metals by achieving CEs of greater than 98% within only the first few cycles. Such a highly flexible and durable semi-tubular carbon film can also protect anodes in ambient environment, suggesting an industrially viable route toward dendrite-free lithium metal batteries.

Film Fabrication and Transfer Process

A method of forming a carbon coating and a battery electrode can comprise forming, on a first substrate, a polymer template comprising interconnected polymer fibers; forming, on the polymer template, a carbon coating to form a carbon-coated polymer template; removing the carbon-coated polymer template from the first substrate; subsequent to removing the carbon-coated polymer template from the first substrate, removing the polymer template from the carbon coating; and disposing the carbon coating on a second substrate.

Figure 2:
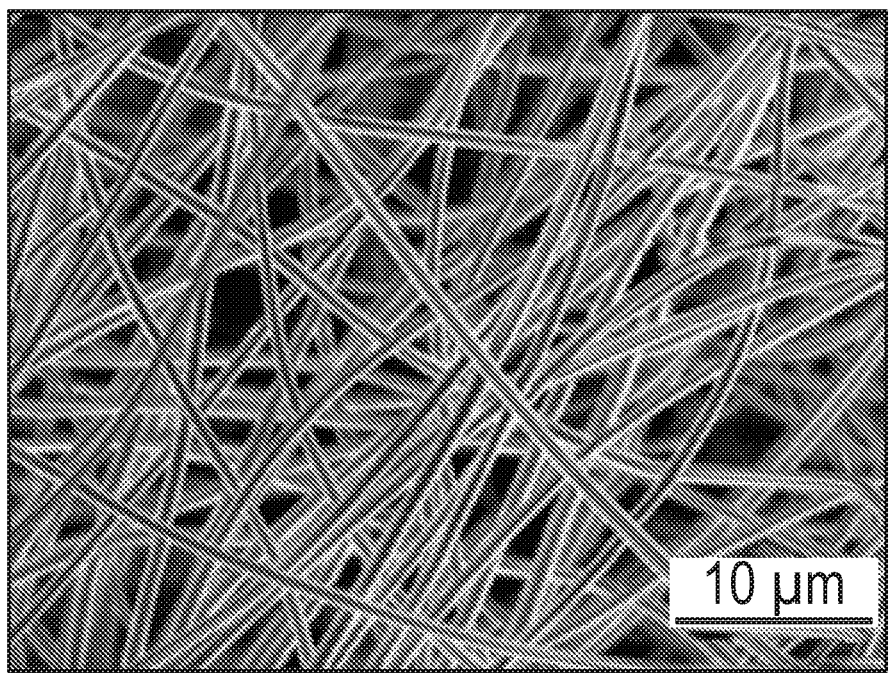
FIG. 2 is a scanning electron microscopy (SEM) image of electrospun polyvinylpyrrolidone (PVP) nanofibers that may be formed at block 102 in FIG. 1 according to certain embodiments of the present disclosure.

FIG. 1 is a schematic illustration of a fabrication and transfer process of semi-tubular carbon films according to certain embodiments of the present disclosure. At block 102 of FIG. 1, a polymer template is formed on a substrate via electrospinning. This template may be formed in a random array as shown in FIG. 1, or in an ordered array where each electrospun fiber is arranged in a pattern with predetermined distances between each pair of fibers. FIG. 2 is a scanning electron microscopy (SEM) image of electrospun polyvinylpyrrolidone (PVP) nanofibers that may be formed at block 102 in FIG. 1. Electrospinning can be utilized to prepare a non-woven polymer nanofiber film. As a template, a variety of polymers, such as, without limitation, PVP, poly (vinyl alcohol), and poly (vinyl butyral), can be employed. As shown in FIG. 2, as-electrospun PVP nanofibers may be continuous and uniform. The fibers may have an average diameter of about 500 nm, in embodiments. In alternate embodiments, the average diameter of the electrospun fibers used for the template may be in a range of from about 50 nm to about 5 μp.

Turning back to FIG. 1, at block 104, the polymer nanofiber film can then be coated with a layer of (e.g., amorphous) carbon by, for example, magnetron sputtering. By tuning the sputtering rate and deposition time, the thickness of the carbon film can be precisely controlled on a nanometer scale.

The carbon-coated polymer nanofiber film can subsequently be removed (for example, peeled off the collector) at block 106. The removed carbon-coated nanofiber film can be placed on the surface of a corresponding solvent operable to remove the polymer template at block 108. In embodiments, for PVP polymers, this template dissolving process can be finished in water within a few seconds, showing immediate visual discoloration from white (polymer films)

to transparent light brown (carbon coatings) as shown in the photographic images in FIG. 1, described further hereinbelow. Subsequent to dissolving the polymer template at block 108 that was formed at block 102, a freestanding transparent carbon film can be lifted from the top by copper (Cu) foils, and forms a conformal layer on the substrate through van der Waals force at block 110.

Figure 3:
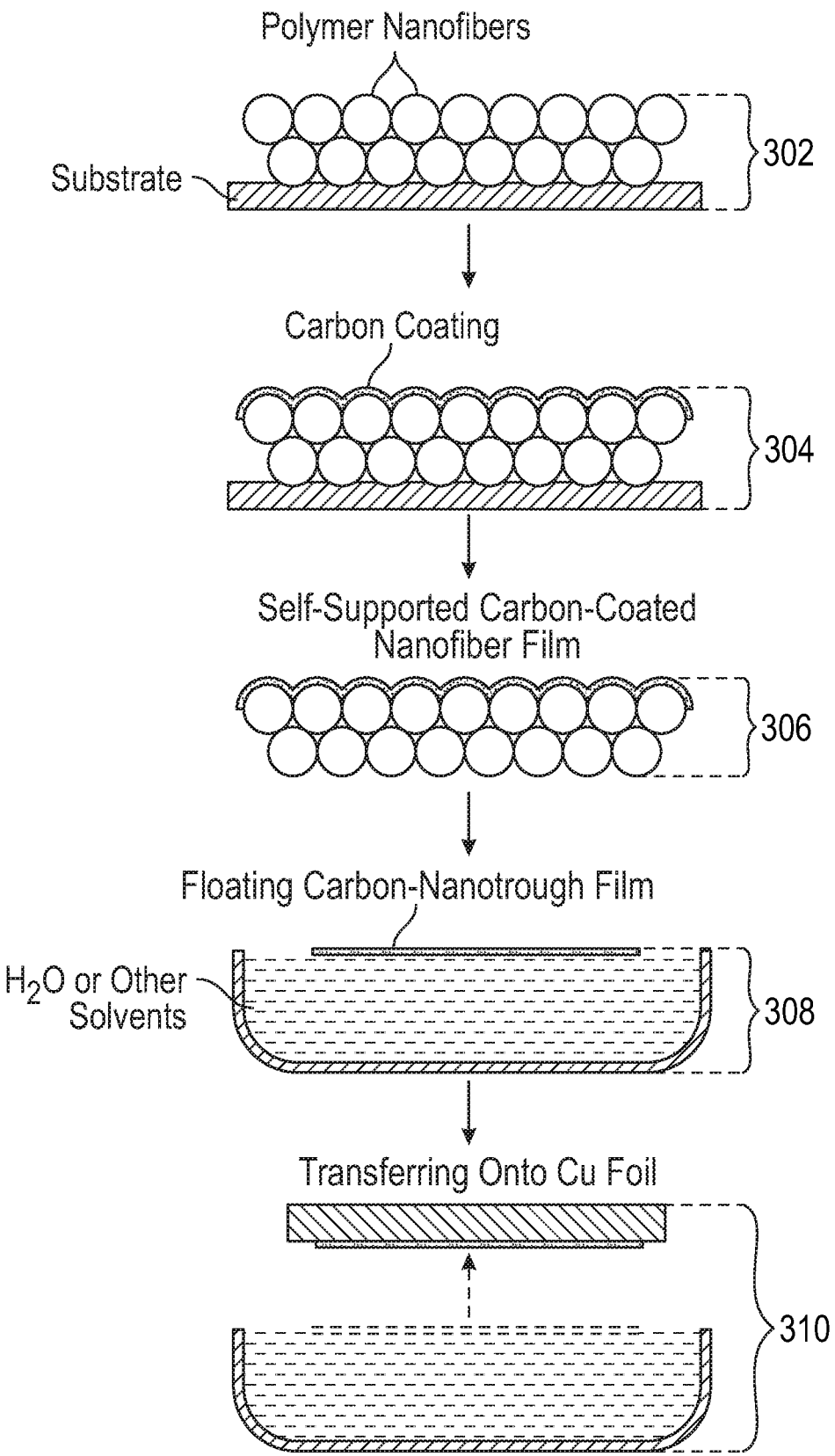
FIG. 3 is a series of partial schematic illustrations of the method in FIG. 1 according to certain embodiments of the present disclosure.

FIG. 3 is a series of partial schematic illustrations of the method of FIG. 1. In FIG. 3, at block 302, a plurality of polymer nanofibers are shown as electrospun on to a substrate, for example, as discussed in the method at block 102. At block 304, the carbon coating formed at block 104 is illustrated. This coating is formed at block 104 around a portion of the polymer nanofibers such that, in one example, the carbon coating does not directly contact the substrate. At block 306, the substrate is removed, as discussed in FIG. 1 at block 106, and the polymer template is dissolved at block 308 using water or other solvents, for example, without limitation, methanol, ethanol, dimethylformamide, or other organic solvents, depending upon the type of polymer employed at block 302.

At block 310, the carbon film separated from the template and floated on the solvent at block 308 can be transferred from the solvent to a second substrate, such as, without limitation, a copper foil, similarly to the transfer discussed in FIG. 1 at block 110. It is to be appreciated that the carbon film is illustrated as flat in blocks 308 and 310 for ease of illustration, in contrast to the magnified view at blocks 304 and 306, which illustrates the semi-tubular nature of the carbon tubes.

A "semi-tubular" geometry, as discussed herein, comprises smooth geometries that are less than 360 degrees around. For example, the semi-tubular carbon structures discussed herein may be in a range of from 180 degrees to 270 degrees around, or from 100 degrees to 350 degrees around, or any other suitable range depending upon the embodiment.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Preparation of Semi-Tubular Carbon Films of this Disclosure

In an embodiment, a nonwoven polymer nanofiber template was prepared by electrospinning of a precursor solution consisting of poly (vinyl pyrrolidone) (PVP, $M_W$=1300,000), ethanol and deionized water at a weight ratio of 1:3:5.5. The precursor was vigorously stirred at room temperature until it turned into a clear sol, and then pumped into a syringe for electrospinning. The syringe was positioned vertically above a piece of aluminum sheet (which serves as the collector) at a distance of about 15 cm. The metallic needle of the syringe and the collector were connected to the positive and negative poles of a DC high-voltage supply, respectively. After electrospinning at a voltage bias of 6 kV for about one hour, the collector was uniformly covered with a layer of nonwoven nanofibers. For carbon coating, the as-electrospun nanofiber film was transferred into the chamber of a magnetron sputtering system (AJA International, Inc.), which was then evacuated to pressure below $5 \times 10^{-7}$ Torr. During sputtering, the pressure was kept at $3 \times 10^{-3}$ Torr, with constant Argon (Ar) flow at a rate of 28 sccm. Radio frequency (RF) power was supplied to a graphite target with power density of 9.87 W cm$^{-2}$. Two carbon coating samples with different thickness were separately prepared.

Example 2

Transfer, Battery Assembly and Electrochemical Testing

To remove the polymer template, the carbon-coated PVP nanofiber film was peeled off the substrate and placed on the surface of deionized water or ethanol in a petri dish. The modified electrode was prepared by transferring a layer of semi-tubular carbon film onto a Cu foil disk (⅝ in.) and dried in a vacuumed oven at 60° C. overnight. 2025-type coin cells were assembled with the modified Cu foil as the working electrode, and Li metal foil as the counter electrode. The electrolyte was 1 M lithium bis (trifluoromethanesulphonyl) imide (LiTFSI) in a mixed solvent of 1,3-dioxolane (DOL) and 1,2-dimethoxyethane (DME) at a volume ratio of 1:1 with 1.0 wt % lithium nitrate (LiNO$_3$). A fixed amount of electrolyte (30 μL) was added in each coin cell. For cycling testing, the batteries were first pre-cycled between 0.01 and 2 V for 10 cycles, and then tested by plating 1.0 mA h cm$^{-2}$ of Li metal onto the modified working electrode and then stripping it up to 2 V.

Example 3

Film Fabrication and Transfer Process

The schematic of the experimental procedures involved in the fabrication and transfer process of our semi-tubular carbon films is shown in FIG. 1, and was described hereinabove. As a highly efficient and industrially scalable method for nanofiber production, electrospinning was adopted to firstly prepare a non-woven polymer nanofiber film. As shown in FIG. 2, the as-electrospun PVP nanofibers were continuous and uniform with an average diameter of 500 nm. By adjusting the polymer concentration in the precursor solution, the diameter of nanofibers was tailored to be comparable to the size of Li dendrites, which is suggested to be the optimum geometry size to inhibit the formation of dendrites. The polymer nanofiber film was then coated with a layer of amorphous carbon by magnetron sputtering. By tuning the sputtering rate and deposition time, the thickness of carbon films can be precisely controlled in nanometer scale. There is a trade-off between sufficient mechanical robustness and small charge transfer impedance for the optimum thickness of carbon coatings. Generally, a thin layer of carbon coating will enable fast ion transportation, while thicker coatings with less pores and defects may offer better physical protection to Li metals. To make a comparison, two semi-tubular carbon film samples with a thickness of 10 and 20 nm, respectively, were prepared. The carbon-coated polymer nanofiber film was subsequently peeled off the collector, and placed on the surface of the corresponding solvent to remove the polymer template. For PVP polymers, this template dissolving process was finished in water within a few seconds, showing immediate visual discoloration from white (polymer films) to transparent light brown (carbon coatings) as shown in the insets of FIG. 1. Finally, this freestanding transparent film was lifted from the top by copper (Cu) foils, and formed a conformal layer on the substrate through van der Waals force.

Example 4

Morphology Characterization and Mechanical Flexibility

Figure 4A:
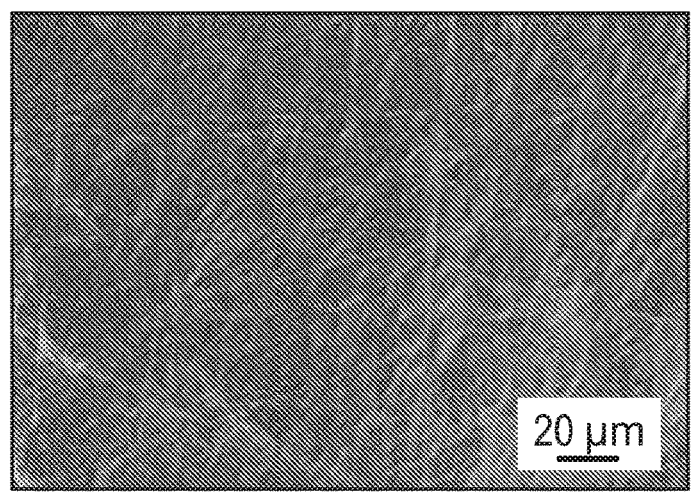
FIGS. 4A-4F illustrate images to show the morphology and mechanical flexibility of semi-tubular carbon electrodes fabricated according to certain embodiments of the present disclosure according to certain embodiments of the present disclosure.
Figure 4B:
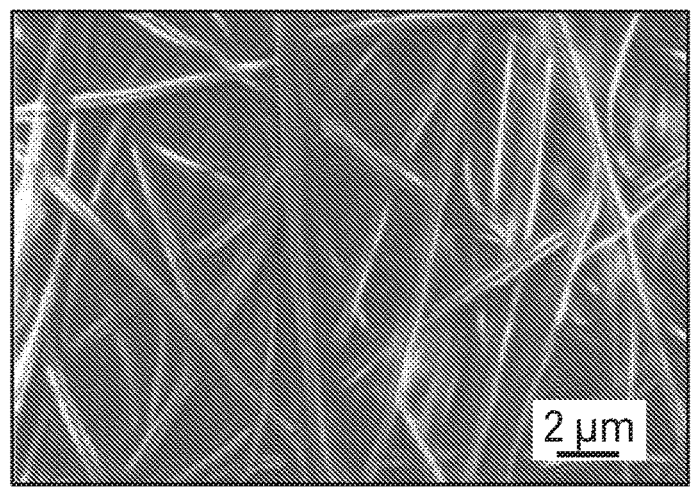
Figure 4C:
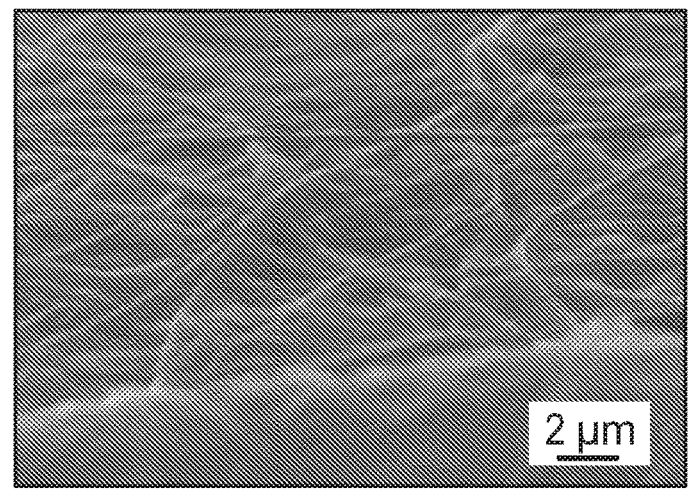
Figure 4D:
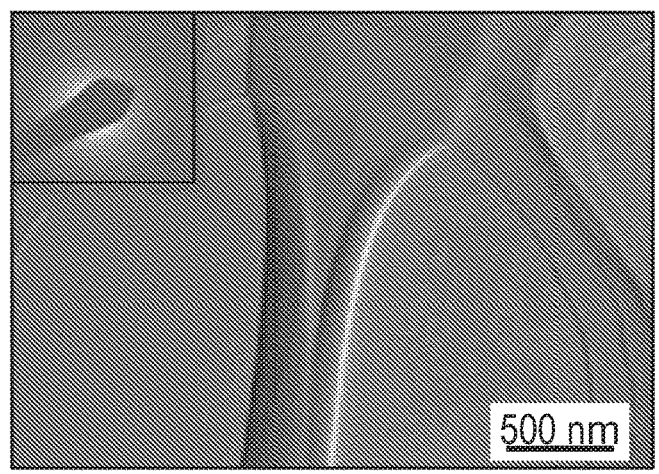

FIGS. 4A-4F illustrate images to show the morphology and mechanical flexibility of semi-tubular carbon electrodes fabricated according to certain embodiments of the present disclosure. The semi-tubular-carbon-coated Cu electrode was observed under scanning electron microscope (SEM). FIGS. 4A and 4B are of the film at different magnifications, as indicated by the scale. Each of FIGS. 4A and 4B shows a densely interconnected semi-tube network without visible pores or other defects (e.g., cracks or bubbles). FIG. 4C is a cross-sectional SEM image of a 20-nm thick semi-tubular carbon film fabricated according to certain embodiments of the present disclosure. FIG. 4D is a transmission electron microscopy (TEM) image of a single carbon semi-tube with a uniform wall thickness of about 10 nm. The inset in FIG. 4D is a selected area diffraction (SAED) pattern that corresponds to the carbon semi-tube and illustrates the amorphous structure of the semi-tube. The corresponding selected area electron diffraction (SAED) pattern on a single carbon semi-tube displays a halo ring, confirming its amorphous structure (inset of FIG. 4D). Amorphous carbon is a disordered carbon phase in long-range order, and has attractive physical properties such as chemical inertness and high hardness, both of which contribute to a stable artificial SEI. As shown in FIG. 4D, due to the unique half-open structure of a semi-tube, the hollow carbon semi-tube can spread out from the open side under ultrasonic force without breaking apart, showing great mechanical flexibility.

Figure 4E:
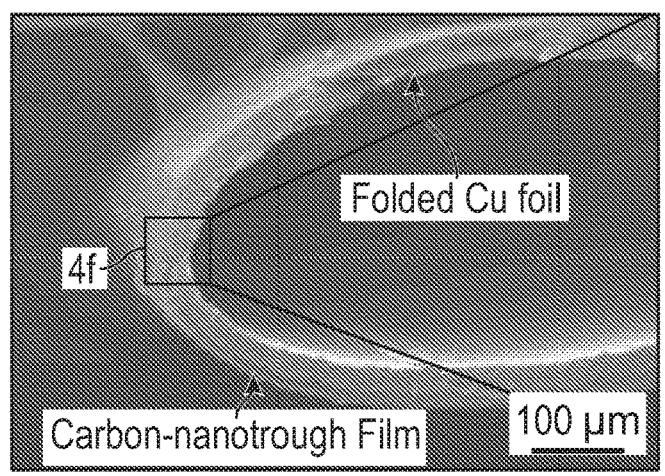
Figure 4F:
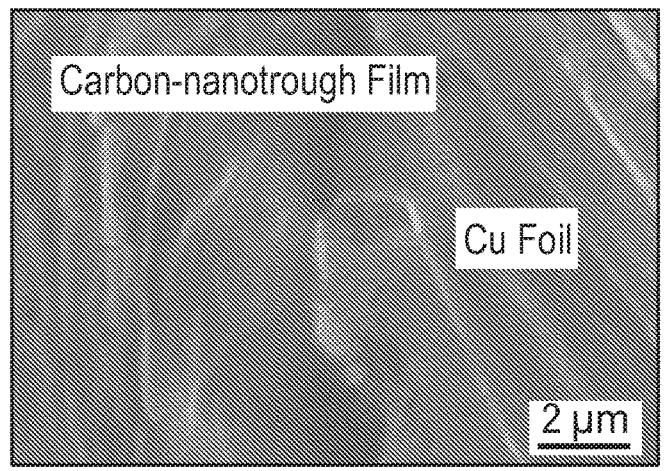

FIGS. 4E and 4F are SEM images of a folded (bent) 20-nm semi-tubular carbon-coated electrode of this disclosure at different magnifications. FIGS. 4E and 4F show the interface structure of the bending area of a semi-tubular-carbon coated electrode after repeated folding and unfolding, showing intimate coupling between them without detachment. Such compliant adhesion is desirable to stabilize Li metal anodes, offering reliable protection to anodes by serving as an attached cap layer.

Figure 5A:
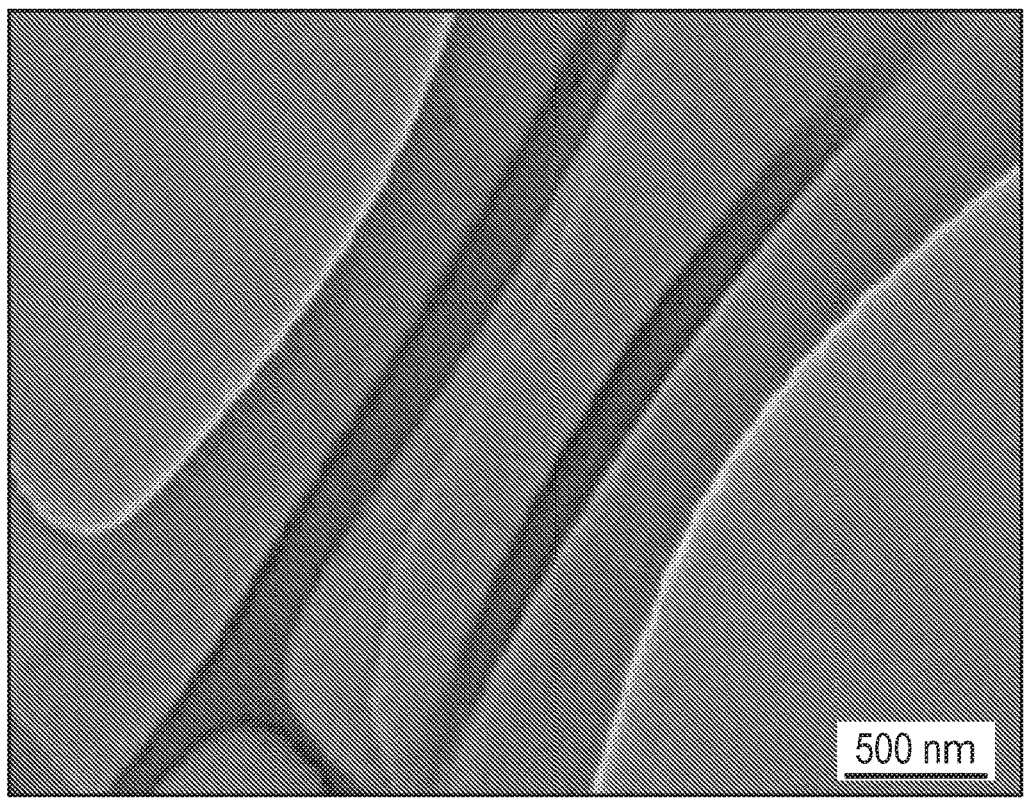
FIGS. 5A and 5B are TEM characterizations (images) that illustrate the semi-tubular structure of a semi-tube with a uniform wall thickness of about 20 nm fabricated according to certain embodiments of the present disclosure.
Figure 5B:
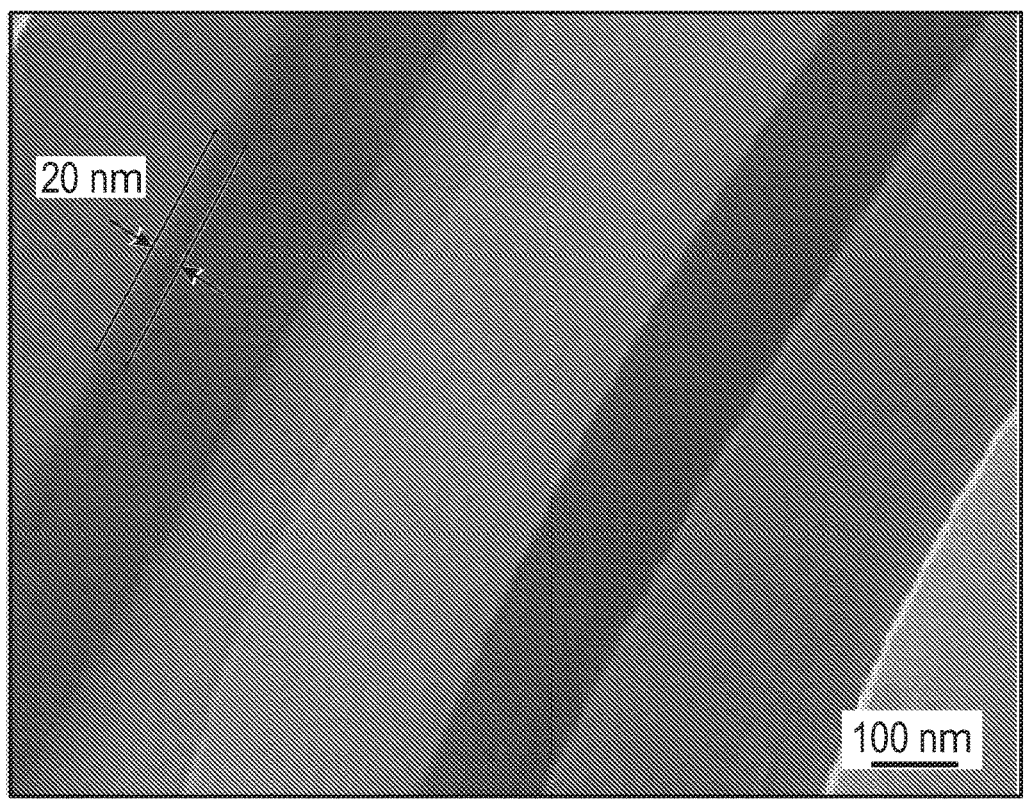

FIGS. 5A and 5B are TEM characterizations (images) that illustrate the semi-tubular structure of a semi-tube with a uniform wall thickness of about 20 nm.

Figures 6A, 6B:
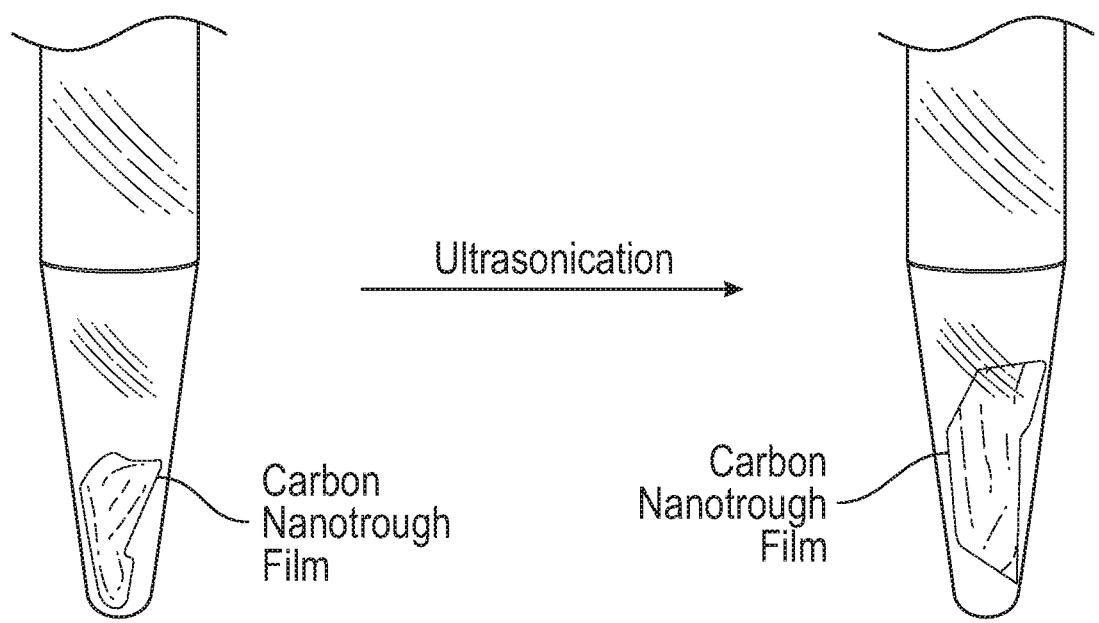
FIGS. 6A and 6B are digital photographs of a freestanding semi-tubular carbon film fabricated according to certain embodiments of the present disclosure.

FIGS. 6A and 6B are digital photographs of a freestanding semi-tubular carbon film. Li metal anodes expand/recede by several microns upon battery charging/discharging and may eventually lose contact with the protection layer. The freestanding film of this disclosure composed of such a mechanically stubborn semi-tube building block also exhibits commercially viable robustness, and is able to adhere to the electrode. In particular, FIG. 6A shows the film before ultrasonification for about 10 minute and FIG. 6B shows the same film after ultrasonification. No mechanical degradation is observed. The semi-tubular carbon films fabricated herein may have forces applied in multiple directions and still recover to an original flatness, this mechanical flexibility endows the semi-tubular carbon film with great ease of transfer and excellent conformity with substrates of varying shapes and transitional features (for example, edges, pockets, and corners).

Example 5

Morphology Changes of Li Deposition on Pristine and Modified Electrodes

Figure 7A:
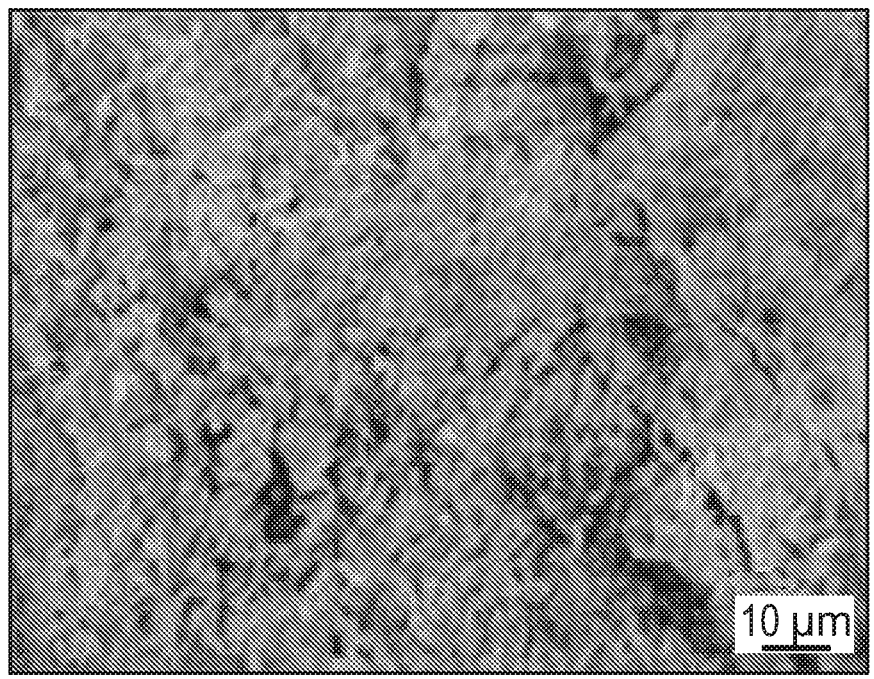
FIGS. 7A-7D are SEM images of bare electrodes and electrodes comprising the semi-tubular carbon coating fabricated according to embodiments of the present disclosure.
Figure 7B:
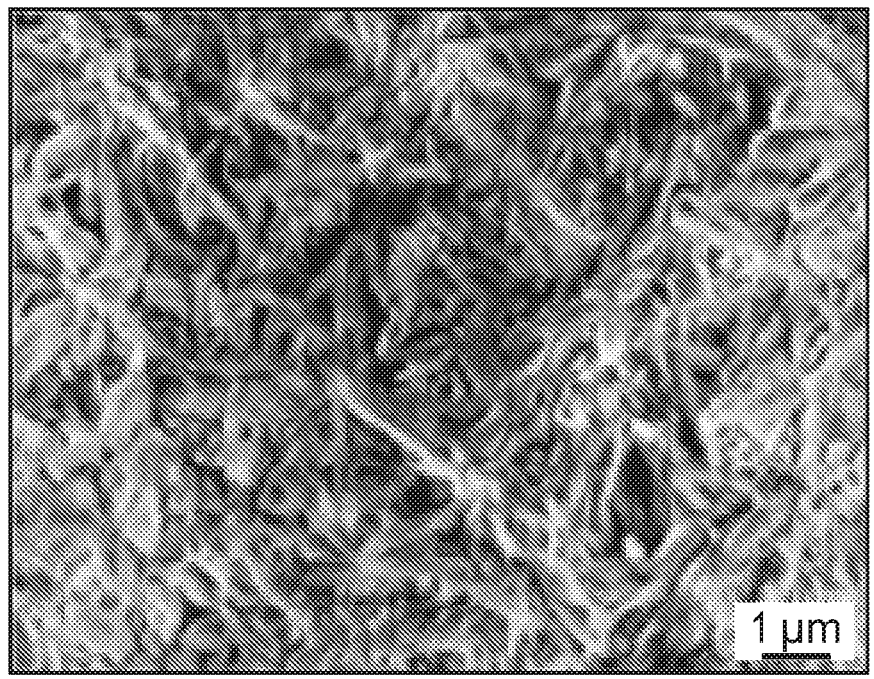
Figure 7C:
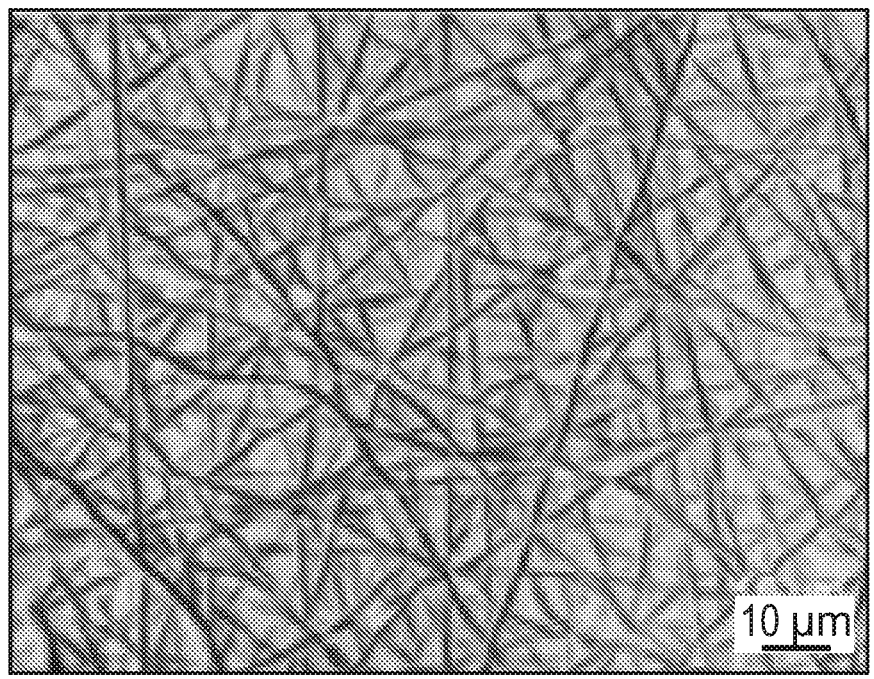
Figure 7D:
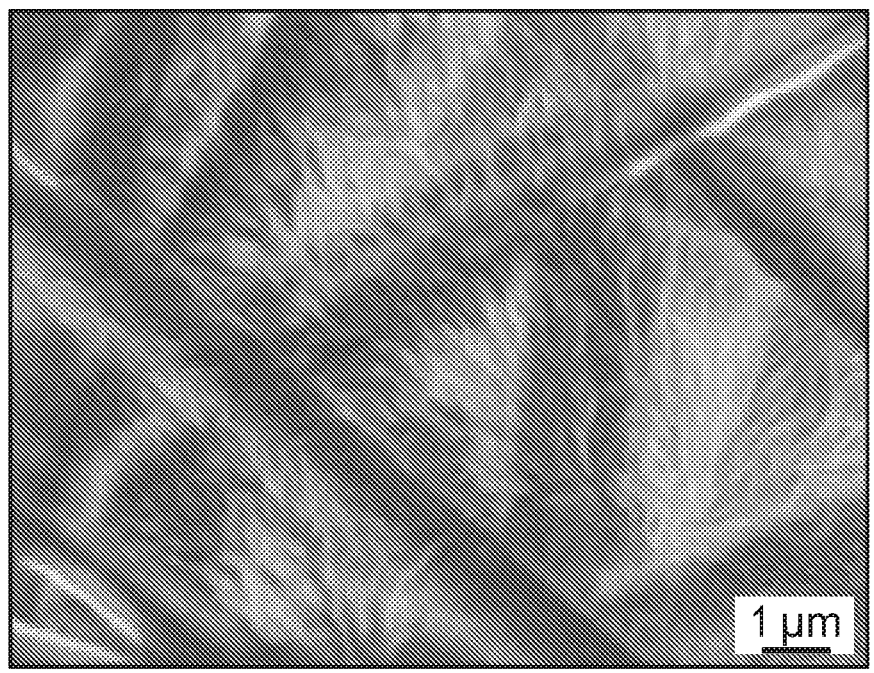
Figure 8A:
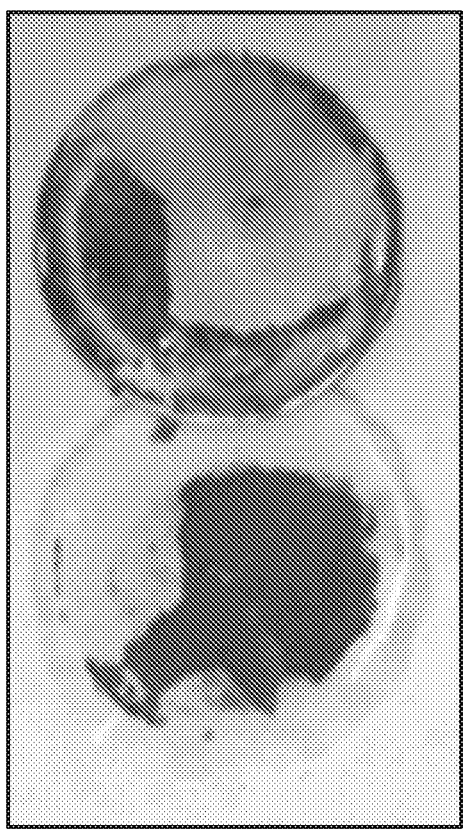
FIGS. 8A and 8B are optical images of bare electrodes and electrodes comprising the semi-tubular carbon coating fabricated according to embodiments of the present disclosure.
Figure 8B:
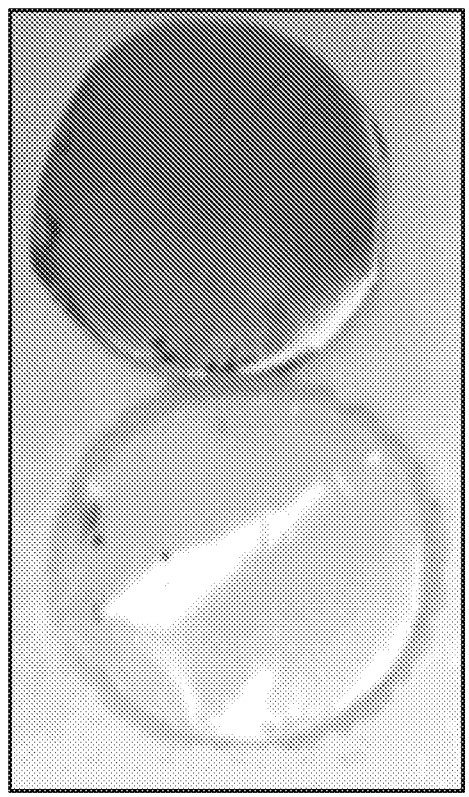

FIGS. 7A-7D are SEM images of bare electrodes and electrodes comprising the semi-tubular carbon coating fabricated according to embodiments of the present disclosure. FIGS. 8A and 8B are optical images of bare electrodes and electrodes comprising the semi-tubular carbon coating fabricated according to embodiments of the present disclosure. FIGS. 7A and 7B are SEM images of the bare electrode at different magnifications and show sharp dendrites formed on the bare Cu, with numerous cracks and pores. Such a mossy, porous Li deposition coating is characterized by a large surface area with inhomogeneous SEI formation, which may result in electrolyte drain or dendrite-induced internal shorting. In contrast, the semi-tubular-carbon coated electrode exhibits a metallic luster without fragmented deposits (as shown in the optical images 8A and 8B). SEM images further show that the modified electrode is smooth in microscale with intact semi-tubular structures in FIG. 7C and a thin SEI layer on top in FIG. 7D. The well-preserved integrity of the carbon coating can be attributed to its superb flexibility with extra space under the hollow semi-tubes to accommodate the volumetric change of Li deposition/dissolution, confirming the herein disclosed design of a stable artificial SEI film.

Asymmetric Cu|Li cells based on semi-tubular-carbon-modified and bare Cu electrodes, respectively, were assembled and tested. After charge/discharge cycling at a practical current density of 0.5 mA cm$^{-2}$, the pristine Cu electrode was covered with spotted black and grey deposits, as shown in FIG. 8A. FIG. 8B shows the electrode that is coated with the semi-tubular carbon coating as disclosed herein, which maintains its luster after cycling, indicating that its structural and electronic integrity are also intact.

Figure 9:
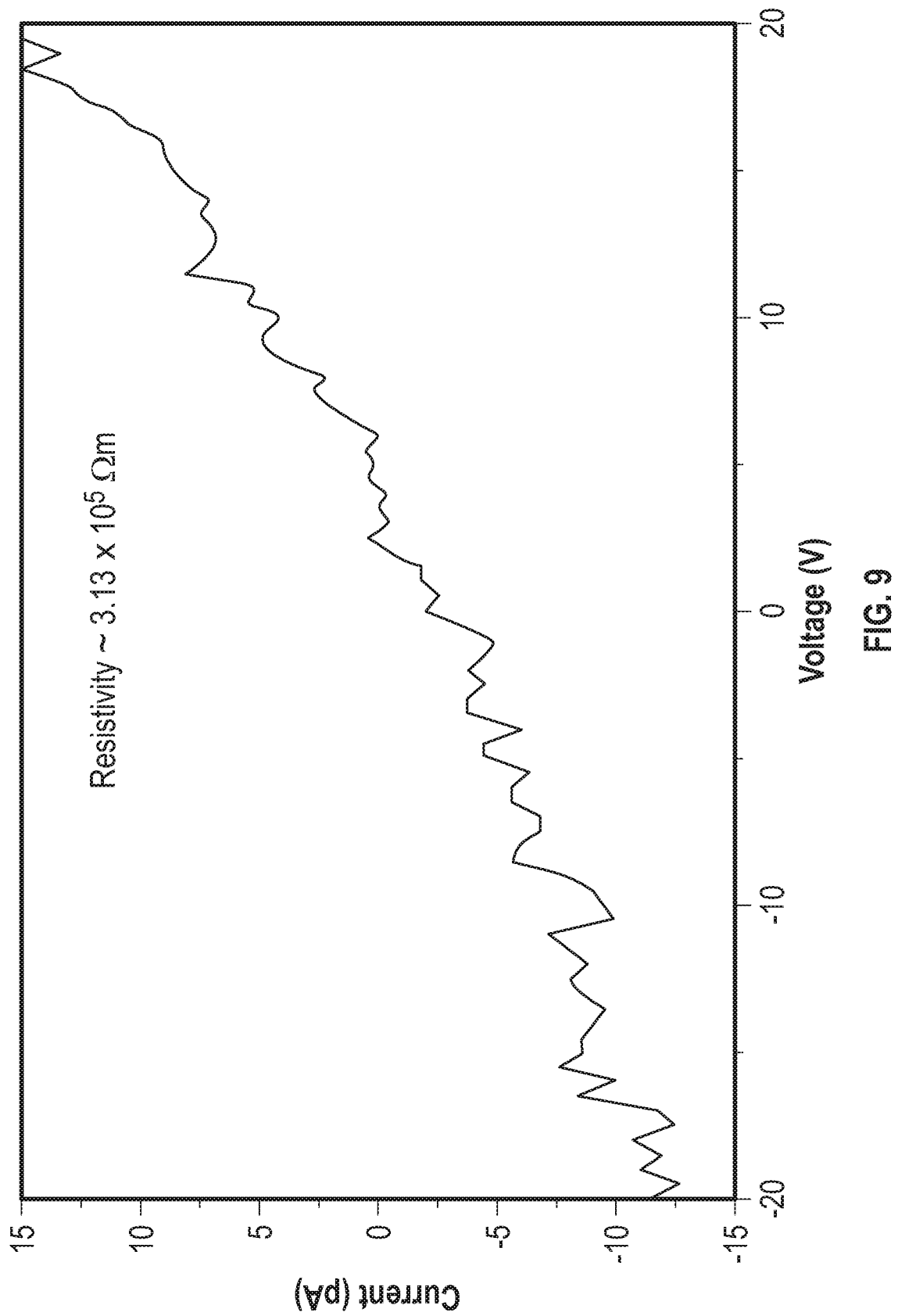
FIG. 9 is a graph of the electrical resistivity of semi-tubular carbon films fabricated according to certain embodiments of the present disclosure.

FIG. 9 is a graph of the electrical resistivity of semi-tubular carbon films fabricated according to certain embodiments of the present disclosure. This amorphous semi-tubular carbon film is highly insulating with a resistivity of 3.13×10$^5$ Ωm, which can avoid Li deposition on top of the carbon film by blocking electrons from the underlying current collect. Meanwhile, the thin SEI layer offers fast Li-ion transportation paths, enabling homogeneous Li nucleation underneath it in the absence of Li dendrites, and successfully preventing Li metals from direct contact with the electrolyte.

Figure 10A:
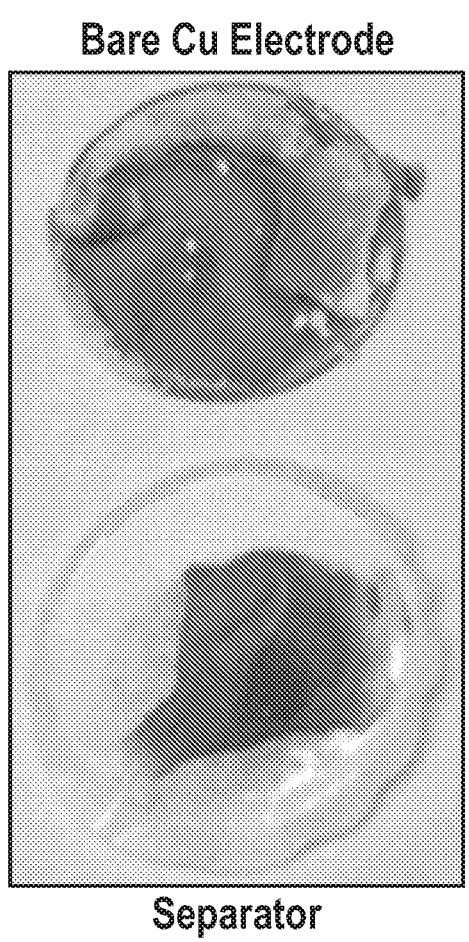
FIGS. 10A and 10B are optical images of recycled pristine and coated copper substrates fabricated according to certain embodiments of the present disclosure.
Figure 10B:
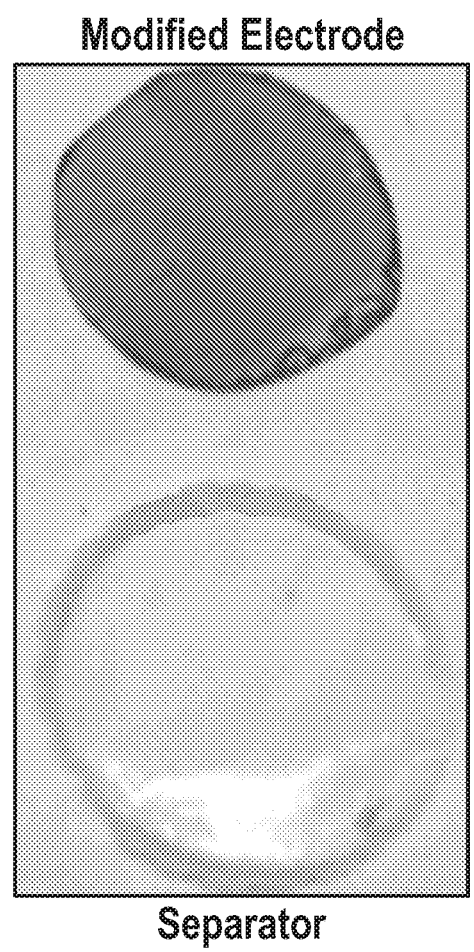

FIGS. 10A and 10B are optical images of recycled pristine and coated copper substrates. FIG. 10A shows a recycled bare Cu electrode placed in ambient air (about 60% humidity) for about 14 days (d). As shown in FIG. 10A, due to the active reactions of Li with oxygen and water in the air the pristine electrode turned completely grey after only a few seconds upon exposure to air. In contrast, the semi-tubular carbon-coated electrode in FIG. 10B maintained its metallic luster with very slight corrosion on the edge of the electrode, demonstrating effective protection of the conformal carbon film of this disclosure to anodes. Thus, the semi-tubular carbon film disclosed herein offers reliable (and commercially viable) protection to electrodes in not only reactive electrolytes, but also ambient environment with high humidity.

Example 6

Electrochemical Properties

Figure 11A:
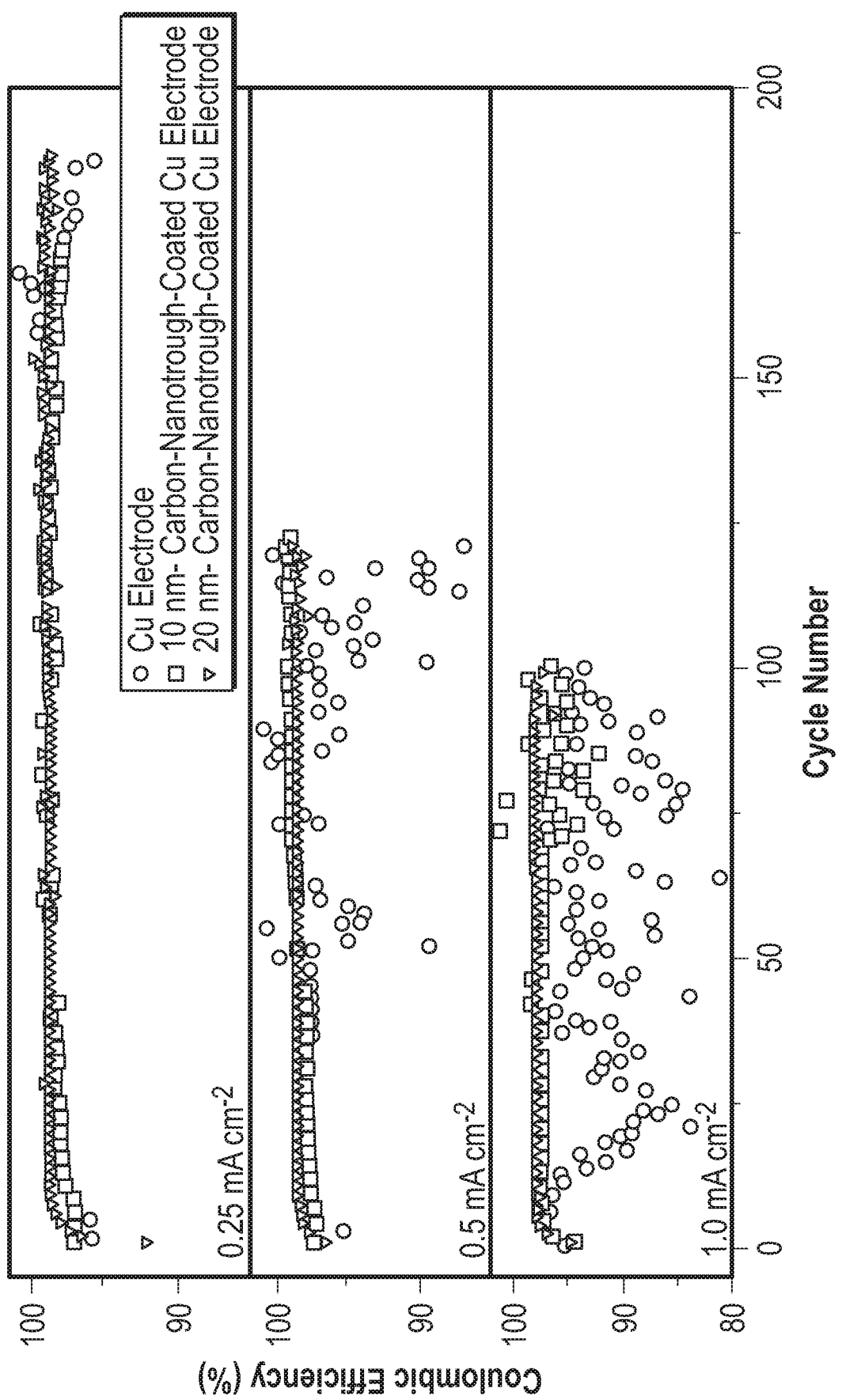
FIGS. 11A-11C are graphs of electrochemical characterizations of coin-type Cu|Li cells with a controlled amount of electrolyte.
Figure 11B:
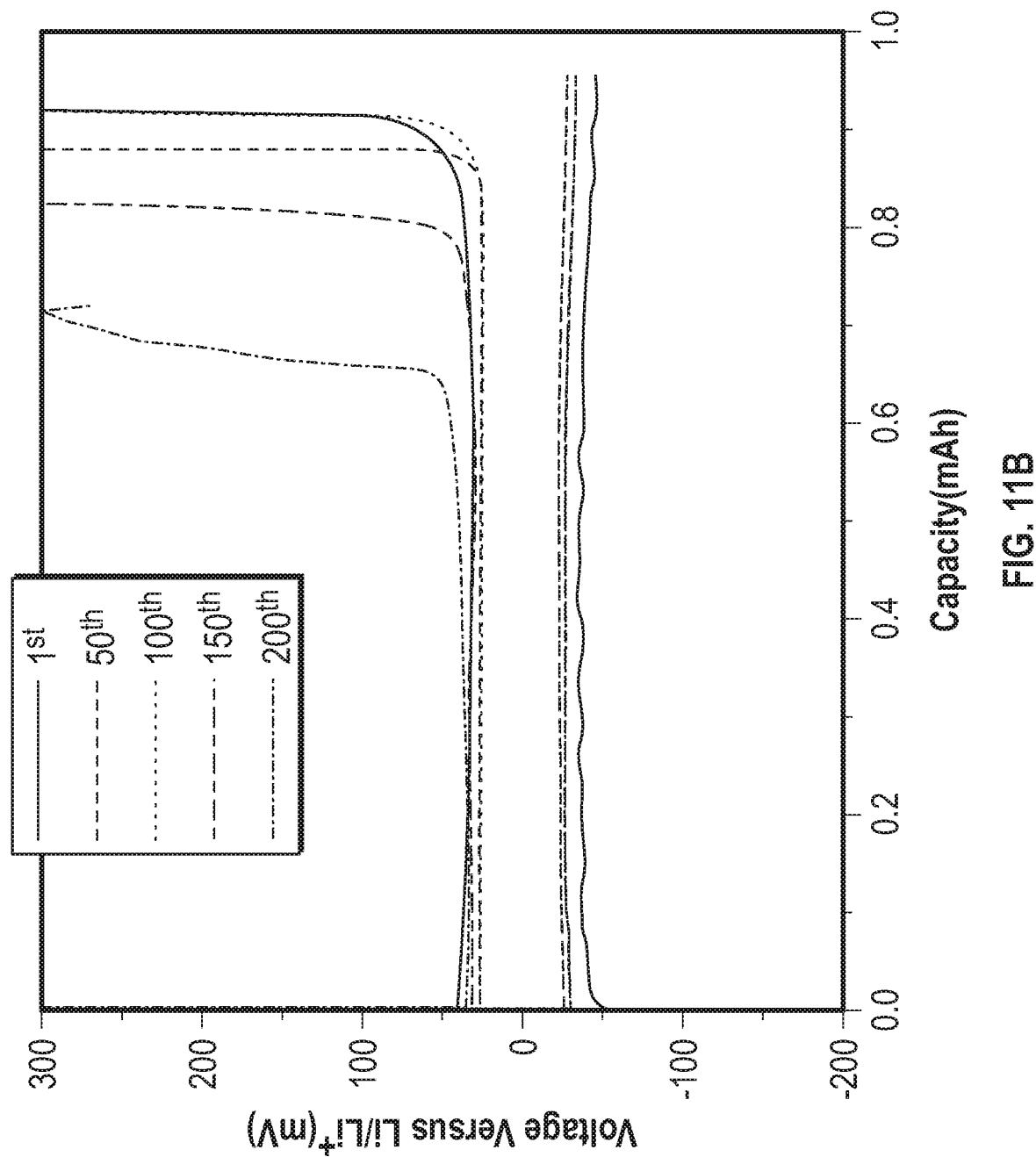
Figure 11C:
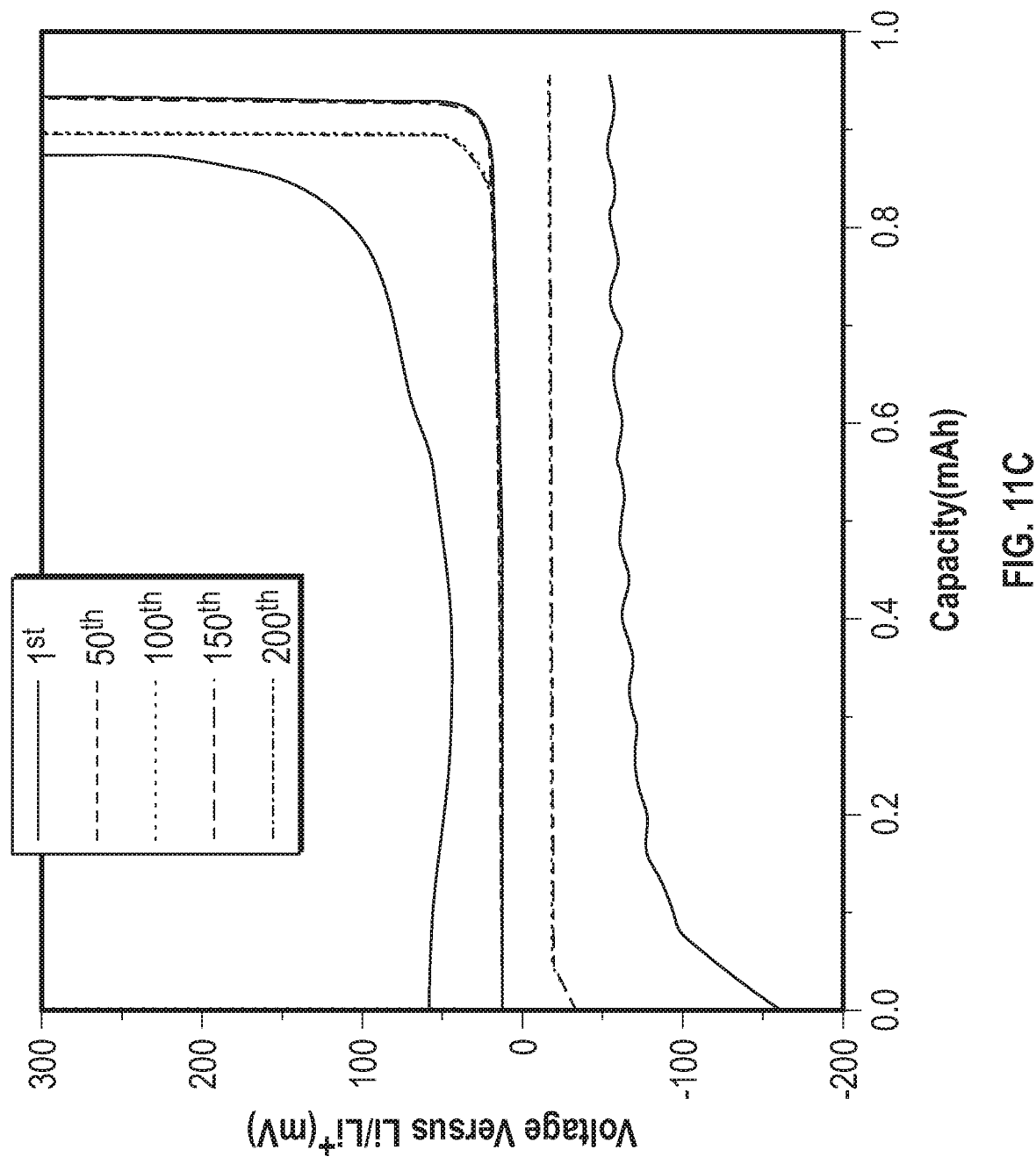

FIGS. 11A-11C are graphs of electrochemical characterizations of coin-type Cu|Li cells with a controlled amount of electrolyte. During each discharge/charge cycle, a fixed amount of Li metal (1.0 mA h cm$^{-2}$) was plated onto the semi-tubular-carbon-modified electrode, and then stripped away. Thus, the CE in FIG. 11A quantifies the amount of Li metal recovered from the working electrode in the reverse stripping process, offering an important parameter to evaluate the cycling efficiency of batteries. As shown in FIG. 11A, the semi-tubular-carbon-coated electrodes exhibit greatly improved cycling stability with enhanced CEs. The CEs of as-modified electrodes can be improved up to about 99.5% at a current density of 0.25 mA cm$^{-2}$, with an extended cycle life of over 180 cycles, and about 99.2% at 0.5 mA cm$^{-2}$ for 125 cycles. In comparison, the CEs of bare Cu electrodes start to fluctuate markedly after 50 cycles at 0.5 mA cm$^{-2}$, with some cycles over 100%, indicating the formation and sporadic activation of 'dead Li'. At a practical current density of 1.0 mA cm$^{-2}$, CEs of greater than 98% can be achieved for the modified electrode and maintained for ca. 100 cycles, in stark contrast to the bare Cu electrode, which shows a rapid decay in CEs after only 10 cycles. Notably, the modified electrodes can reach a high, steady CE of greater than 98% within only the first few cycles (e.g., 5 cycles at 0.25 mA cm$^{-2}$; 4 cycles at 0.5 mA cm$^{-2}$), while it takes much longer time for the bare Cu electrodes to achieve that value with the aid of LiNO$_3$ additive (e.g., 15 cycles at 0.25 mA cm$^{-2}$; 25 cycles at 0.5 mA cm$^{-2}$), suggesting an instant and more efficient protection of the herein disclosed semi-tubular carbon film as an artificial SEI layer than in-situ formed intrinsic SEI films. Electrodes modified with 20-nm-thick semi-tubular carbon films exhibit even better cycling stability compared to 10-nm-thick samples, which can be attributed to the higher coating quality with improved compactness and robustness.

One difference between semi-tubular-carbon-modified electrodes as per this disclosure and pristine electrodes is also reflected by the change of cell polarization (hysteresis) state with extended cycling. As shown in FIG. 11B, the overpotentials of Li plating/stripping on bare Cu electrodes are changing constantly with cycling, displaying an overall increase after the first 75 cycles.

Figure 12:
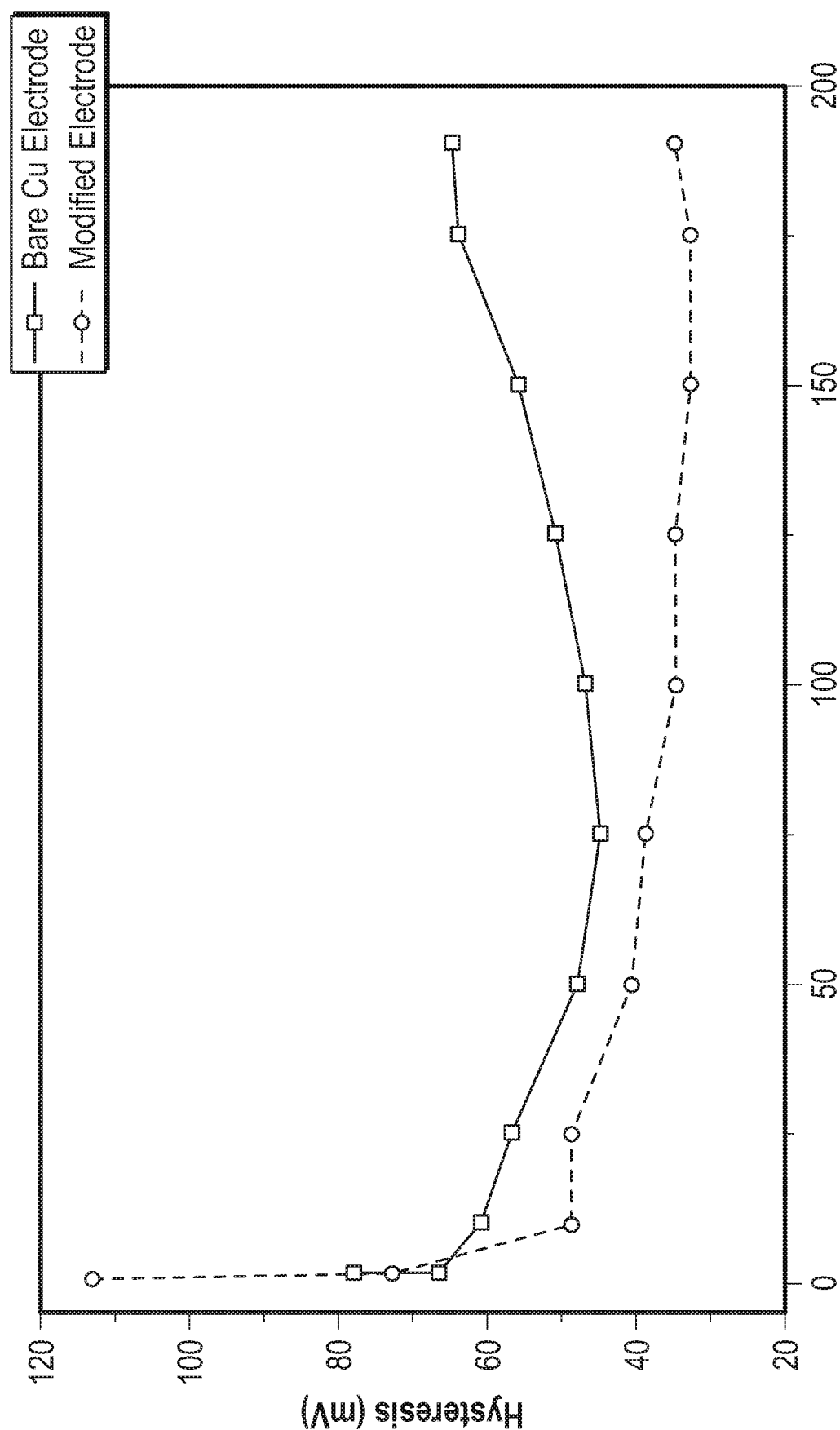
FIG. 12 is a graph of a comparison of the polarization hysteresis of the Li plating/stripping process on pristine electrodes and on electrodes comprising the semi-tubular carbon coating fabricated according to certain embodiments of the present disclosure.

FIG. 12 is a graph of a comparison of the polarization hysteresis of the Li plating/stripping process on pristine electrodes and on electrodes comprising the semi-tubular carbon coating of this disclosure. The varied polarization hysteresis goes up to 65 mV with gradual capacity decay, as shown in FIG. 12, indicating continuous reaction between Li metal and electrolyte along with increasing internal resistance caused by thickening SEI films. In comparison, and turning back to FIGS. 11A-11C, the modified electrode demonstrates superior cycling stability with remarkably reduced polarization as shown in FIG. 11C. The modified electrode exhibits an initial overpotential of about 110 mV due to interlayer diffusion through the semi-tubular carbon film, which drops rapidly after the first cycle and levels off at around 35 mV after ca. 25 cycles, as shown in FIG. 12. The stabilized low polarization hysteresis results from the greatly reduced interfacial resistance of the herein disclosed thin and robust semi-tubular carbon film, which can effectively protect the electrode against the corrosive electrolyte while preserving its integrity during repeated Li deposition/dissolution.

High, stable CEs can be achieved within a first few cycles, e.g., from 3 cycles to 5 cycles, with the semi-tubular-carbon-coated electrodes of this disclosure. In contrast, it may take tens of cycles or even days of pretreatment for chemical passivation to form an intrinsic SEI layer. Furthermore, the entire fabrication process of this disclosure can be carried out, in embodiments, at room temperature with great ease of transferring and superior stability in ambient environment, resulting in improved cycling performance with enhanced CEs of about 99.2% at 0.5 mA cm$^{-2}$ for 125 cycles.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RL and an upper limit, RU is disclosed, any number falling within the range is specifically disclosed. In particular, the following numbers within the range are specifically disclosed: R=RL+k*(RU−RL), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

Additional Description

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the terms "optionally," "may," "might," "possibly," and the like with respect to any element of a claim means that the element is required, or alternatively, the element is not required, both alternatives being within the scope of the embodiments. Also, references to examples are merely provided for illustrative purposes, and are not intended to be exclusive.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Embodiments disclosed herein include:

A: A method of forming a battery electrode, the method comprising: forming, on a first substrate, a polymer template comprising interconnected polymer fibers; forming, on the polymer template, a carbon coating to form a carbon-coated polymer template; removing the carbon-coated polymer template from the first substrate; subsequent to removing the carbon-coated polymer template from the first substrate, removing the polymer template from the carbon coating; and disposing the carbon coating on a second substrate.

B: A solid electrolyte interphase (SEI) layer for use in a battery electrode, the SEI layer comprising: a semi-tubular carbon film comprising two or more adjacent smoothly-curved, intersecting structures that extend less than 360°.

C: An electrode comprising an SEI layer comprising: a semi-tubular carbon film comprising two or more adjacent smoothly-curved, intersecting structures that extend less than 360°.

D: A battery comprising an electrode comprising an SEI layer comprising a semi-tubular carbon film comprising two or more adjacent smoothly-curved, intersecting structures that extend less than 360°.

Each of embodiments A, B, C, and D may have one or more of the following additional elements: Element 1: wherein forming the polymer template comprises forming the polymer template via electrospinning. Element 2: wherein electrospinning comprises electrospinning a precursor solution comprising poly (vinyl pyrrolidone) (PVP), ethanol, and deionized water. Element 3: wherein the polymer fibers comprise nanofibers. Element 4: wherein the polymer template comprises a random array of polymer fibers. Element 5: wherein the polymer fibers have an average diameter in a range of from about 50 nm to about 5 μp. Element 6: wherein the polymer template comprises an ordered array of polymer fibers. Element 7: further comprising forming the carbon coating to a thickness of 5 nm to 30 nm. Element 8: wherein removing the polymer template comprises dissolving the polymer template in water, methanol, ethanol, or dimethylformamide. Element 9: wherein removing the polymer template comprises dissolving the polymer template in an organic solvent. Element 10: wherein the second substrate comprises a conductive material. Element 11: wherein the carbon coating is freestanding, flexible, and nanostructured. Element 12: wherein the semi-tubular carbon film or carbon coating has a thickness in a range of from about 5.0 nm to about 1 micron. Element 13: further comprising a substrate onto which the semi-tubular carbon film is disposed. Element 14: wherein the semi-tubular carbon film is nanostructured. Element 15: operable to inhibit the formation of lithium dendrites in a Li metal battery. Element 16: having a Coulombic efficiency (CE) of greater than 98% for at least 100 cycles at a current density of $1.0$ mA cm$^{-2}$.

While several exemplary embodiments have been provided in the present disclosure, it should be understood that the disclosed systems and methods may be embodied in many other specific forms without departing from the spirit or scope of the present disclosure. The exemplary embodiments are to be considered as illustrative and not restrictive, and the intention is not to be limited to the details given herein. Many variations and modifications of the embodiments disclosed herein are possible and are within the scope of the invention, that scope being as set out in the claims that follow. For example, the various elements or components may be combined or integrated in another system or certain features may be omitted or not implemented. Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the exemplary embodiments set out above. Unless expressly stated otherwise, the steps in a method claim may be performed in any order and with any suitable combination of materials and processing conditions. The disclosures of all patents, patent applications, and publications cited herein are hereby incorporated by reference.

What is claimed is:

1. A method of forming a battery electrode, the method comprising:

forming, on a first substrate, a polymer template comprising interconnected polymer fibers;

forming, on the polymer template, a carbon coating to form a carbon-coated polymer template;

removing the carbon-coated polymer template from the first substrate;

subsequent to removing the carbon-coated polymer template from the first substrate, removing the polymer template from the carbon coating; and disposing the carbon coating on a second substrate.

2. The method of claim 1, wherein forming the polymer template comprises forming the polymer template via electrospinning.

3. The method of claim 2, wherein electrospinning comprises electrospinning a precursor solution comprising poly(vinyl pyrrolidone) (PVP), ethanol, and deionized water.

4. The method of claim 1, wherein the polymer fibers comprise nanofibers.

5. The method of claim 1, wherein the polymer template comprises a random array of polymer fibers.

6. The method of claim 5, wherein the polymer fibers have an average diameter in a range of from about 50 nm to about 5 μm.

7. The method of claim 1, wherein the polymer template comprises an ordered array of polymer fibers.

8. The method of claim 7, wherein the polymer fibers have an average diameter in a range of from about 50 nm to about 5 μm.

9. The method of claim 1 further comprising forming the carbon coating to a thickness of 5 nm to 30 nm.

10. The method of claim 1, wherein removing the polymer template comprises dissolving the polymer template in water, methanol, ethanol, or dimethylformamide.

11. The method of claim 1, wherein removing the polymer template comprises dissolving the polymer template in an organic solvent.

12. The method of claim 1, wherein the second substrate comprises a conductive material.

13. The method of claim 1, wherein the carbon coating is freestanding, flexible, and nanostructured.

14. A solid electrolyte interphase (SEI) layer for use in a battery electrode, the SEI layer comprising:

a semi-tubular carbon film comprising two or more adjacent smoothly-curved, intersecting structures that extend less than 360°.

15. The SEI layer of claim 14, wherein the semi-tubular carbon film has a thickness in a range of from about 5.0 nm to about 1 micron.

16. The SEI layer of claim 14 further comprising a substrate onto which the semi-tubular carbon film is disposed.

17. The SEI layer of claim 14, wherein the semi-tubular carbon film is nanostructured.

18. The SEI layer of claim 14, operable to inhibit the formation of lithium dendrites in a Li metal battery.

19. An electrode comprising the SEI layer of claim 14.

20. The electrode of claim 19, having a Coulombic efficiency (CE) of greater than 98% for at least 100 cycles at a current density of 1.0 mA $cm^{-2}$.

* * * * *